US007065244B2

(12) United States Patent
Akimov

(10) Patent No.: US 7,065,244 B2
(45) Date of Patent: Jun. 20, 2006

(54) METHOD OF MAPPING A THREE DIMENSIONAL AREA

(75) Inventor: Vassili A. Akimov, Moscow (RU)

(73) Assignee: Laurence A. Boyd, Newport News, VA (US)

( * ) Notice: Subject to any disclaimer, the term of this patent is extended or adjusted under 35 U.S.C. 154(b) by 0 days.

(21) Appl. No.: 10/193,279

(22) Filed: Jul. 12, 2002

(65) Prior Publication Data

US 2004/0008881 A1    Jan. 15, 2004

(51) Int. Cl.
*G06K 9/00*    (2006.01)

(52) U.S. Cl. ...................... 382/154; 382/106; 382/113; 382/180

(58) Field of Classification Search ................ 382/106, 382/113, 154, 180, 285
See application file for complete search history.

(56) References Cited

U.S. PATENT DOCUMENTS

| 5,364,093 A * | 11/1994 | Huston et al. ............... 473/407 |
| 5,524,081 A * | 6/1996 | Paul ........................... 701/300 |
| 5,685,786 A * | 11/1997 | Dudley ....................... 473/407 |
| 5,689,431 A * | 11/1997 | Rudow et al. ............... 701/213 |
| 5,740,077 A * | 4/1998 | Reeves ....................... 473/407 |
| 5,850,341 A * | 12/1998 | Fournier et al. .............. 701/50 |
| 5,878,369 A * | 3/1999 | Rudow et al. .............. 701/215 |
| 6,456,938 B1 * | 9/2002 | Barnard ....................... 701/213 |
| 6,517,353 B1 * | 2/2003 | Jones ........................ 434/252 |
| 2002/0163547 A1* | 11/2002 | Abramson et al. .......... 345/855 |

FOREIGN PATENT DOCUMENTS

JP          10-076043      *  3/1998

* cited by examiner

*Primary Examiner*—Joseph Mancuso
*Assistant Examiner*—Patrick Edwards
(74) *Attorney, Agent, or Firm*—Breiner & Breiner, L.L.C.

(57) ABSTRACT

Digitized mapping of a three dimensional area includes dividing the area into a plurality of primary regions having defined closed contours which are considered flat. Within selected primary regions, one or more secondary regions having defined closed flat contours are identified. Plan coordinate information for the contours of each primary and secondary region is then determined and stored in a file in a hierarchical fashion, where each selected primary region has stored thereunder identified secondary regions thereof. Certain primary and/or secondary regions are also designated for which elevation information is additionally desired. An imaginary grid of lines is defined on each of the designated regions, so that three dimensional coordinate information for each line intersection point of each grid is determined. This intersection point three dimensional coordinate information is stored in a file, whereby elevation information about each of the designated regions is available.

22 Claims, 4 Drawing Sheets

```
HOLE # 1
    |---- FAIRWAY
    |---- TEE-OFF (+ELEV)
    |---- GREEN (+ELEV)
            |---- PIN (+ELEV)
    |---- SAND TRAP A
    |---- SAND TRAP B
```

HOLE # 1
   |---- FAIRWAY
   |---- TEE-OFF (+ELEV)
   |---- GREEN (+ELEV)
       |---- PIN (+ELEV)
   |---- SAND TRAP A
   |---- SAND TRAP B

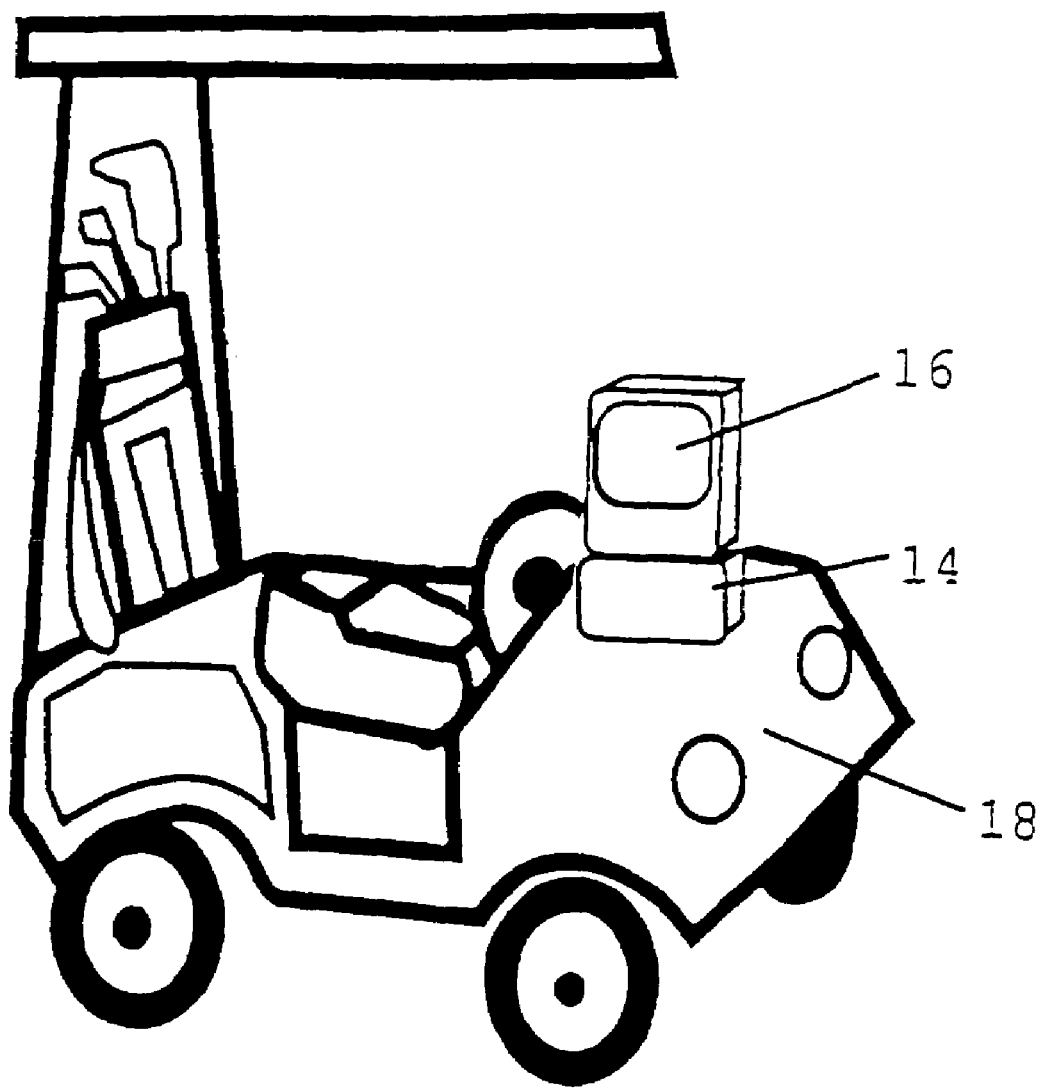
PROPOSED FIG. 3

PROPOSED FIG. 4A
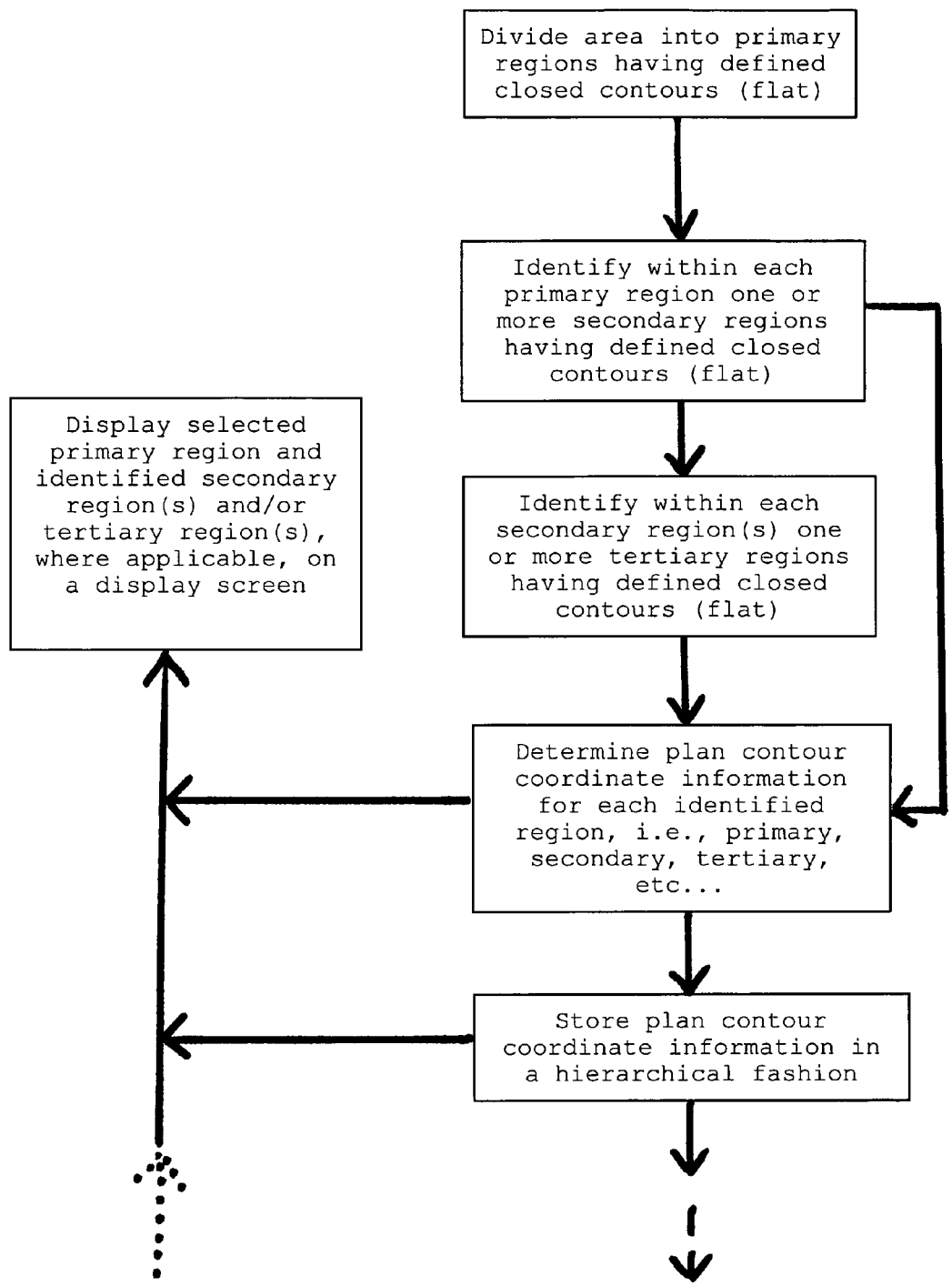

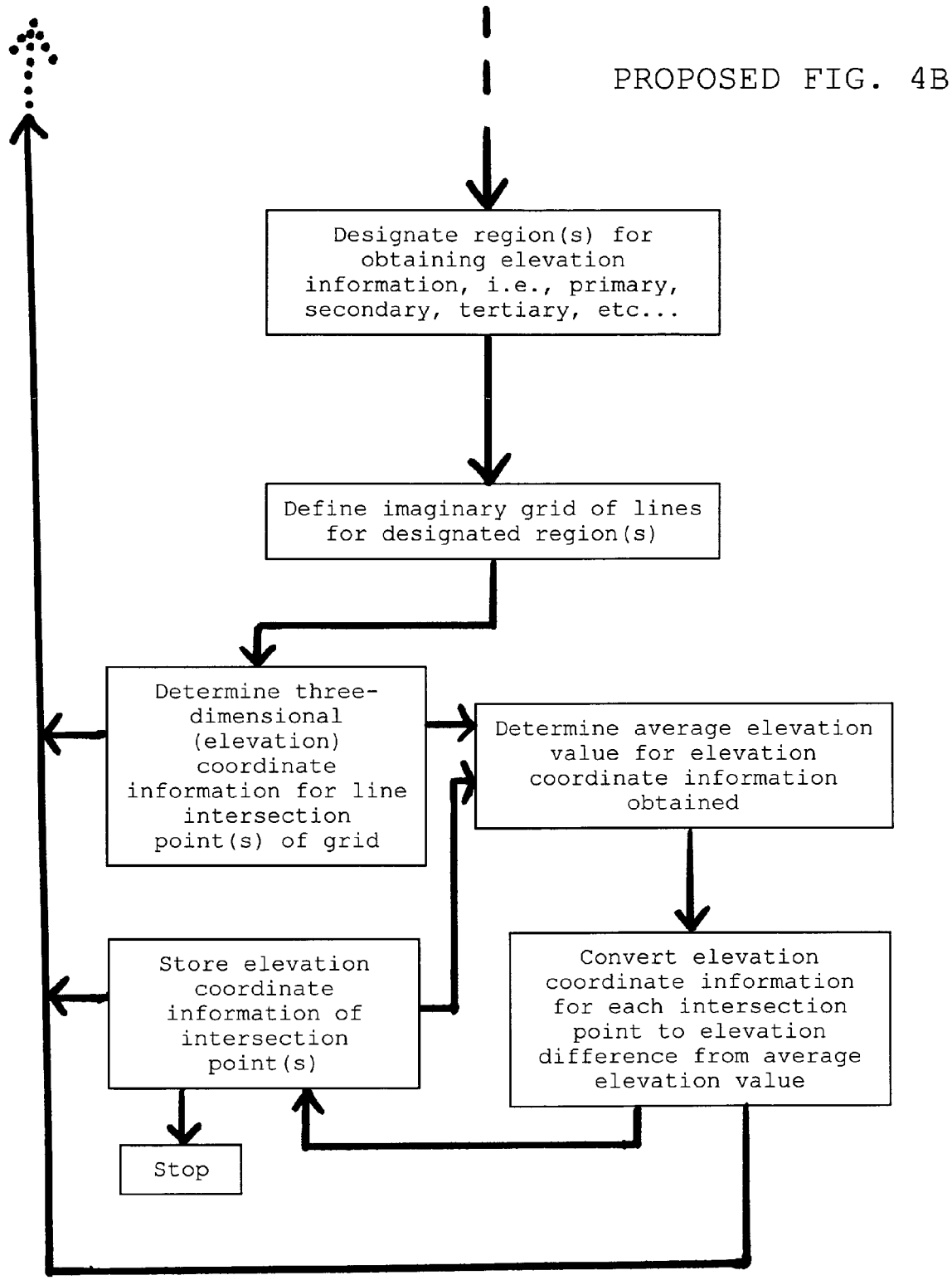
PROPOSED FIG. 4B

METHOD OF MAPPING A THREE DIMENSIONAL AREA

BACKGROUND OF THE INVENTION

One common method to map a three dimensional area is to divide the area to be mapped into imaginary contours of equal elevation and to store the data for these contours. This is typically referred to as a "topographical" map. To achieve a desired accuracy, equal elevation contours are measured with a step size which is proportional to the required accuracy. This is an exact method of mapping, however it is not easily software related for graphic interface as it requires expensive memory for the large amount of data to be stored or the software runs very slowly.

For golf courses and the like, mapping and the use of the map with graphic interface software is well known. Such software typically has a map or graphical view of some area, such as the golf course as a whole and/or specific holes of the golf course. A graphical interface is typically provided on each golf cart, as well as a central location for monitoring of the whole course. On each golf cart is a sensor which senses location thereof, such that the interface typically provides not only a depiction of the present hole but a distance to the pin or center of the green from the golf cart. However, when a player must leave the golf cart (e.g., where the golf cart must stay on the cart path), the distance measurement given will not necessarily (and typically will not) be the same as the distance from the golf ball to the pin or center of the hole. In addition, such systems are GPS based, so that if there is any problem with the GPS or with GPS reception, such systems are rendered inoperative until the problem is corrected.

In U.S. Pat. No. 6,236,940 (Rudow et al.) and U.S. Pat. No. 6,263,279 (Bianco et al.), a "vector-based map storage scheme" is described which is based on global positioning coordinates. According to these methods, the perimeters of the important features of the hole are mapped (possibly using least square fittings to reduce the number of coordinates needed), so that a vector list is ultimately compiled to describe each feature as a flat outline of an area. When displayed, colors are used for certain feature areas, such as a sand color for sand traps and green for a putting surface (green). No use is made of any elevation data for the features.

While such prior art methods for schemes have proven useful, there is still a need to provide the mapping data in an easily used format as well as to provide elevation data in a useful manner, all of which must be consistent with the data storage limitations and software application run times.

BRIEF SUMMARY OF THE INVENTION

In accordance with the present invention, a method of digitized mapping of a three dimensional area is provided. This method divides the area into a plurality of primary regions having defined closed contours which are considered flat. Next, within selected primary regions, one or more secondary regions having defined closed contours which are considered flat are identified. Plan coordinate information for the contours of each primary region and of each secondary region is then determined. This plan contour coordinate information is stored in a file in a hierarchical fashion where each selected primary region has stored thereunder identified secondary regions thereof. In addition, certain primary and/or secondary regions are designated for which elevation information is additionally desired. An imaginary grid of lines is then defined on each of the designated regions, so that three dimensional coordinate information for each line intersection point of the grid of each designated region can be determined. This intersection point three dimensional coordinate information is stored in a file, whereby elevation information about each of the designated regions is available.

In a preferred embodiment, an average elevation value from all elevation information obtained is initially determined. Thereafter, the elevation information of each grid intersection point is stored as a difference from the average elevation value. The elevation information can then be used by inquiring about an elevation value at a selected location between intersection points, and then interpolating of the inquired elevation value at the selected location using the intersection points located about the selected location.

In the preferred embodiment, the determining steps include the step of converting the coordinate information into a digital format. Then, the storing steps store the digitally formatted coordinate information in a data base as text files.

Also in the preferred embodiment, a selected primary region and identified secondary regions associated therewith are displayed for the user. This displaying includes the generating of an image of the selected primary region and then drawing in the identified secondary regions on the primary region. In addition, the regions are displayed to a scale, such that a distance between any two points on the displayed regions is proportional to an actual physical distance therebetween.

Where applicable, the present invention further includes the identifying within selected secondary regions of one or more tertiary regions having defined closed contours which are considered flat. Next, plan coordinate information for the contours of each tertiary region are determined, and the plan contour coordinate information of each tertiary region is stored in the file in a further hierarchical fashion where each selected secondary region has stored thereunder the identified tertiary regions thereof. Preferably, certain tertiary regions are then designated for which elevation information is desired, so that an imaginary grid of lines is then defined on each of the designated tertiary regions and the three dimensional coordinate information for each line intersection point of the grid of each designated tertiary region are determined. This intersection point three dimensional coordinate information of each tertiary region is then stored in a file whereby elevation information about each of the designated tertiary regions is available.

It is an advantage of the present invention that a relatively small amount of data is required to be stored, thus it does not require a large space or memory size for data storage. This also improves the performance of any software using this data.

It is also an advantage of the present invention that only necessary data is stored. In particular, flat (plan) coordinates for easily recognized physical (existent) contours of regions are determined and stored. Then, if it is determined that an elevation value is needed for a particular flat region, additional measurements are then taken and stored separately; and accessed and presented as needed.

It is a further advantage of the present invention that data for primary, secondary and tertiary regions are stored in a hierarchical manner, for easy storage and as well as quick retrieval and use in a graphic-layer manner. This makes software development faster and easier as well. In addition, no special database is necessary, so that the data can be stored as a simple text file.

It is a still further advantage of the present invention that if data is needed for points intermediate the collected contour data, that such data can be interpolated from the collected contour data.

It is yet another advantage of the present invention that the same software developed for one area can be used with another area simply by changing a data file. It is still another advantage of the present invention that an input device such as a touch screen is used to navigate over a region with the region displayed according to a scale such that by touching two points on the screen a distance between the two points is calculated and displayed.

Other features and advantages of the present invention are stated in or apparent from detailed descriptions of presently preferred embodiments of the invention found hereinbelow.

BRIEF DESCRIPTION OF THE SEVERAL VIEWS OF THE DRAWING

FIG. 3 is a perspective view of a computer and display screen, such as a touch input display, of the present invention in the field of use on a golf cart.

FIG. 4A–4B is a block diagram flow chart of an exemplary embodiment of the method of the present invention.

DETAILED DESCRIPTION OF THE INVENTION

Figures 1, 2:
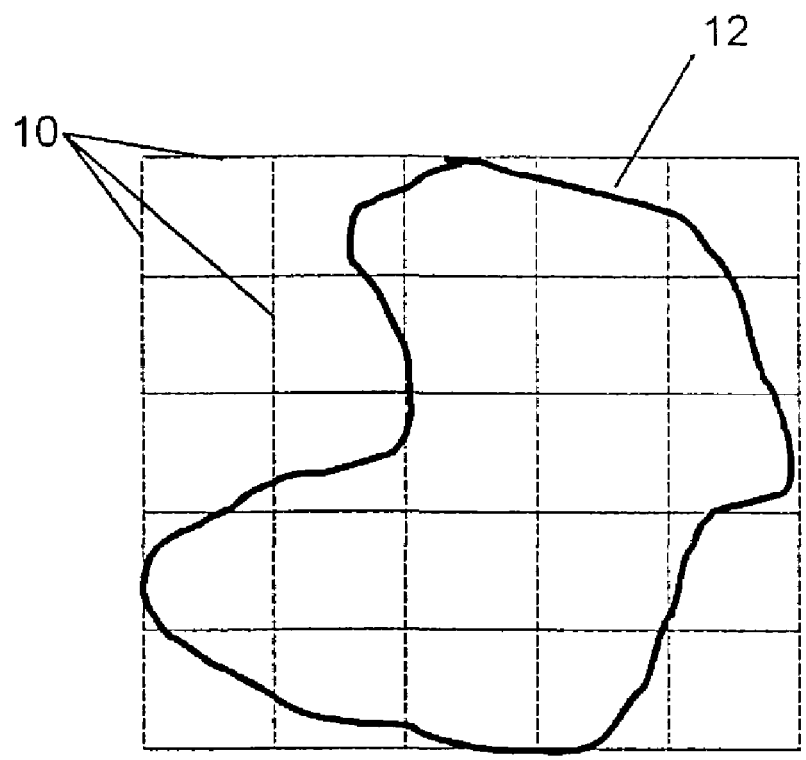
FIG. 1 is a schematic representation of the hierarchical storage classes for contour data of the present invention.
FIG. 2 is a schematic representation of a region where elevation values are desired.

With reference now to the drawings in which like numerals represent like elements, it will initially be appreciated that the present invention is a digitizing mapping algorithm which is used to convert geographical coordinates of established and maintained three dimensional areas into an easily useable and digital format. A compact and detailed digital map of the regions of the area to be used by software applications is thus created and typically stored in a computer, and typically a central computer as well as numerous mobile computers 14. One exemplary use is for the mapping of a golf course, but the algorithm is useful as well for other areas such as landscaping, marine and other environments containing identifiable regions and sub-regions. For golf course applications, as shown in FIG. 3, the present invention allows a manager with a central computer at a clubhouse or the like to maintain the course by obtaining data from mobile computers 14 mounted on golf carts 18 in real-time using a digitized map. In particular, the central computer receives information from each cart-mounted computer 14 on the golf course and displays a cart icon on the central display for each golf cart. The central display can display the whole course, or a selected hole as desired.

In addition or alternatively, the golf course application could be player oriented. With the player orientation, a small computer 14 equipped with a display screen 16, such as a touch screen, on the player's golf cart 18 does not need to send detailed position information to the central computer. Rather, the cart-mounted computer 14 keeps track of the cart location locally, and precisely represents this location in the graphical way on the touch screen 16 to the player as presently done in the art. Further, using the digital format of the areas in accordance with the present invention allows the player to access the on-board computer to measure the distance between any two player selected points on a displayed map of the present hole or region being played (as explained in greater detail hereinbelow).

The advantage of the present invention is that a user (owner or manager) can easily initially define, locate and map a three dimensional area such as a golf course by identifying specific regions thereof. Examples of such regions include tee boxes, greens, mulch areas (typically found around a green), sand traps, hazards, out of bounds, etc. To accomplish this, the selected regions of the three dimensional area must have well maintained, defined borders. For example, a golf course typically consists of: a number of holes, a clubhouse, parking lot(s), roads, practice area(s), restaurant(s), non-golf structures, etc. In accordance with the present invention, such items are classified as elements or regions of interest, and are represented as the first classes or primary regions in the software to be used.

Within each class/element or primary region, there can be sub-elements or secondary regions. These secondary regions are preferably provided with specific provisions which define relationships between the associated element or primary region and the sub-element or secondary region thereof. In addition, and as far as necessary, there can be similar defined relationships between sub-elements or secondary regions and further sub-elements or tertiary regions. For example, as shown in FIG. 1, under the primary region "HOLE #1", there are the secondary regions "FAIRWAY", "TEE-OFF", "GREEN", "SAND TRAP A", AND "SAND TRAP B". Obviously, other secondary regions where applicable should also be used, such as: "LAKE", "CREEK", "OUT OF BOUNDS", "WOODS", "TREE(s)", "SECOND TEE-OFF", "CART PATH", "GROUND UNDER REPAIR", etc. Next, under the sub-elements or secondary regions there are further sub-elements or tertiary regions, such as the tertiary region "PIN". Other such tertiary regions which would or could be used where applicable include "[COLOR] TEE" (typically black, gold, blue, white, red, etc. designations for the different exact tee positions of varying difficulties), "TRAP" (or other obstacle or the like located in the "FAIRWAY" region), etc. Thus, using this method or system of hierarchy, maps of the primary regions and sub-regions can be superimposed to create a series of overview maps of the whole golf course for display on a computer screen, graphical interface (such as on a cart) or the like (such displaying being well known in the art).

In order to digitize the map of a region (or sub-region), all that is needed in accordance with the present invention is the coordinates of the borders or contours of the selected region. With the present invention, each region is initially treated as having a flat (plan, or two dimensional) contour. Coordinate information of the borders of a region are thus easily measured using a Global Positioning System device or the like (as well known in the art, including digital corrections thereto, etc. for providing very accurate measured data). With this procedure, it will be appreciated that only two plan coordinates are used for each point needed to define the border or contour of each region, as all regions are initially considered as flat. Conveniently, software is used to store the data and to draw two dimensional or plan contours from the data and making a plan map of the whole area as is also well known in the art.

While all regions are initially considered to be flat (two dimensional), it is an advantage of the present invention that where desired for some pre-designated regions, elevation information is made available. Thus, while the two dimensional information is stored for each region as noted above, the third dimension for designated regions (or all of the regions constituting an entire hole, if desired, as for half-piped holes) is also recorded, for example as a correction. From all of these recorded elevations, an average (or "sea level") elevation value of all recorded elevations is then calculated and used thereafter as a baseline. Then, where it is desired to include elevation information about a region, the values thereof are all ultimately calculated as a difference from the average value.

For example, it may be desired to know and display elevation information about a region, such as a fairway which is hilly or "half-pipe" shaped, a valley which is deep or a hazard, or a sand trap which has a high lip in front thereof. On the display using a standard scale (typically the whole hole layout scale used as an initial display at the beginning of each hole), a hilly or half-piped hole will appear with three dimensional markings such as carrots ("v") with the apex pointing down slope. Smaller regions having elevation information will appear flat on the whole hole display, but will show elevation information in the same manner when that region is displayed at some larger scale than the standard. In addition, when the user selects two points on the display to obtain distance information, any elevation difference between the two points will also be displayed.

Such elevation information can be obtained and stored as a separate (extra) property of the designated (secondary) region. To accomplish this with a generally high degree of accuracy (needed to show elevation for a typically not large sand trap), an imaginary grid of lines 10 is defined on the defined border 12 of the sand trap as shown in FIG. 2. Grid of lines 10 must include border 12 therein, and the number of grid lines is determined by the level of elevation accuracy needed (typically one yard or one meter grid lines are sufficient. For larger regions, such as a half-pipe shaped fairway, a larger spacing of grid lines would be sufficient and easier such as five or ten yards or meters. Thus, the exact line spacing would be determined for each region based on the needed degree of accuracy.

Using grid lines 10, accurate GPS measurements including elevation are made at each grid line intersection point, and all intersection points are then stored separately with the elevation values calculated as a difference from the average value as noted above. With this data, it will be appreciated that elevation information between the points can be calculated as an average value of, or more precisely if desired interpolated from, the elevations of the surrounding four points. This elevation information is also relatively compact as well as being easily accessible, making its use on mobile computers much easier.

With the above in mind, it will be appreciated that the present invention is an algorithm which basically comprises the following steps when applied to an area including a golf course: dividing of the golf course area into simple elements or primary regions; subdividing of the primary regions, as needed, into secondary regions; as necessary, further subdividing the secondary regions into tertiary regions (and so on as further necessary); obtaining coordinate information for the contours of all regions, which coordinate information is stored in a suitable computer file; identifying or designating regions (either primary, secondary, tertiary, or . . . ) for which elevation information is desired; defining an imaginary grid of lines on those designated regions with a distance between the grid lines selected to provide a desired accuracy; and obtaining coordinate information of the intersection points of the grid lines of each region, which grid lines coordinate information are stored in a suitable computer file.

The database for all of this information is preferably a simple text file. Preferably, the text file consists of short headers that describe the region name, define whether the region is a sub-region of a larger region, and identify if elevation information is needed for this region. Regions could be separated from each other by a blank row if desired for easier reading by the programmer. Coordinate information of the border would then follow the header and be represented by sets of two numbers, corresponding to the defined X and Y (flat/plan) coordinates. This process preserves space in the data file and simplifies the data format. For regions requiring elevation information, separate data is then stored as noted above and which, as also noted above, can be used for calculating other elevation points. While such a calculation is approximate, it should be of sufficient accuracy for players and the like.

A suitable software is then used to read the data file as known or as writable by those of ordinary skill in the art. This software identifies the primary regions, and which secondary regions are categorized under each primary region (and which tertiary regions are under each secondary region, etc.). Thus, all of the contours of the regions are stored in a designed hierarchy, whereby each contour may contain another (lower level) contour and/or be contained in another (higher level) contour. This hierarchical data is thus stored in a C++ class-ready manner for easy use with such commonly used and compatible software. After this identifying process, the software represents the data in a graphic view in which primary regions are drawn on a lower graphic level and each secondary region is drawn on top of its primary region (and likewise each tertiary region is drawn on the associated secondary region, etc.).

The software considers in its calculations that the X and Y directions are both linear, so that the plan view is drawn with a certain scale value that is calculated from the screen resolution. The scale for both X and Y directions is the same, resulting in a simple software map in which the distance between any two computer screen points is proportional to the physical distance between corresponding real "points" on the hole (or golf course). The proportion coefficient is equal to the scale value. If required, elevation for the current point is found using additional data.

With this proportionality of the region displayed on the screen, for player applications the screen is then preferably equipped with a touch input device to provide a touch input display such as a touch screen (alternatively, a laser pointer, mouse, trackball, etc. could be used as desired) and associated computer mounted on a golf cart. In addition, the software of the touch input display and computer is adapted so that a player can determine the distance between any two points on the screen by going to a distance determining mode and touching the two points of interest (and repeating this procedure if multiple distance calculations are desired). Typically, one of the points of interest will be the location of the player's ball as estimated by the player, which is especially useful where the cart cannot be driven to the ball location, for example when the cart must remain on the cart path. The other point of interest is thus typically where the player would like to hit the ball, or not hit the ball. The two points are touched (inputted) so that the software of the touch input display and computer senses the selected points and suitably displays the touched points as well as the distance between the two points. This feature thus allows a player to determine such things as the distance to and/or the carry distance over a hazard or feature (e.g., sand trap, lake, creek, out of bounds, etc.) from a tee or any other point on the hole, including of course the distance to the pin.

Unlike prior systems which relied on real-time GPS measurements to determine present position of a cart, the present invention utilized the digitized map loaded into the small computer on each golf cart. While the position of each golf cart is preferably determined with reference to the base unit and digitized map in real time by the central computer for course management purposes, each cart has its own touch input display and computer which senses from a sensor at each new hole what hole the cart is on and displays the appropriate hole/region map on the screen. Alternately, the cart-mounted computer can be manually switched at each new hole to the new hole, or the cart-mounted computer can sense the new hole based on a signal from the central computer. The cart display is not dependent on any real time GPS measurements. Thus, if there is some problem with the GPS measurement, the system of the present invention still functions properly for both the base t and the cart/golfer. While the present invention has been described with respect to exemplary embodiments thereof, it will be understood by those of ordinary skill in the art that variations and modifications can be effected within the scope and spirit of the invention.

I claim:

1. A method of digitally mapping and displaying a three dimensional golf course area comprising the steps of:
    dividing the area into a plurality of primary hole regions having defined closed contours which are considered flat;
    identifying within selected primary hole regions one or more secondary regions having defined closed contours which are considered flat;
    determining plan coordinate information for the contours of each primary hole region and of each secondary region, said determining step including the step of converting the coordinate information into a digital format;
    storing the plan contour coordinate information in a file of a computer located on a golf cart in a hierarchical fashion where each selected primary hole region has stored thereunder identified secondary regions thereof;
    tracking a hole location of a golf cart with the computer thereon;
    displaying the primary hole region to which the golf cart has been tracked and identified secondary regions associated therewith on a touch input display associated with the computer mounted on the golf cart, wherein the primary hole region and the identified secondary regions are displayed to a scale such that a distance between any two points within the primary hole region is proportional to an actual physical distance therebetween;
    calculating a distance between two selected points within the primary hole region, said calculating step including the steps of
        putting the touch input display into a calculating mode,
        designating locations representative of the two selected points on the touch input display,
        calculating the distance between the designated locations with the computer, and
        displaying the distance calculated between the two designated points;
    designating certain primary hole and/or secondary regions for which elevation information is additionally desired;
    defining an imaginary grid of lines on each of the designated regions;
    determining of three dimensional coordinate information for each line intersection point of the grid of each designated region;
    storing of the intersection point three dimensional coordinate information in a file whereby elevation information about each of the designated regions is available; and
    displaying the elevation information on the touch input display by putting the touch input display in an elevation displaying mode with the computer.

2. A method of digitized mapping as claimed in claim 1, further including the steps of:
    determining an average elevation value from all elevation information obtained; and
    storing of the elevation information of each grid intersection point as a difference from the average elevation value.

3. A method of digitized mapping as claimed in claim 2, further including the steps of:
    inquiring about an elevation value at a selected location between intersection points; and
    interpolating of the inquired elevation value at the selected location using the intersection points located about the selected location.

4. A method of digitized mapping as claimed in claim 1, wherein said storing step stores the digitally formatted coordinate information in a data base as text files.

5. A method of digitized mapping as claimed in claim 1, wherein said displaying step includes the step of generating an image of the selected primary hole region and then drawing in the identified secondary regions on the primary hole region.

6. A method of digitized mapping as claimed in claim 1, and further including the steps of:
    identifying within selected secondary regions one or more tertiary regions having defined closed contours which are considered flat;
    determining plan coordinate information for the contours of each tertiary region;
    storing of the plan contour coordinate information of each tertiary region in the file in a further hierarchical fashion where each selected secondary region has stored thereunder the identified tertiary regions thereof; and
    displaying the tertiary regions associated with the secondary regions being displayed.

7. A method of digitized mapping as claimed in claim 1, and further including the steps of:
    identifying within selected secondary regions one or more tertiary regions having defined closed contours which are considered flat;
    determining plan coordinate information for the contours of each tertiary region;
    storing of the plan contour coordinate information of each tertiary region in the file in a further hierarchical fashion where each selected secondary region has stored thereunder the identified tertiary regions thereof;
    displaying the tertiary regions associated with the secondary regions being displayed;
    designating certain tertiary regions for which elevation information is desired;
    defining an imaginary grid of lines on each of the designated tertiary regions;
    determining of three dimensional coordinate information for each line intersection point of the grid of each designated tertiary region; and
    storing of the intersection point three dimensional coordinate information of each tertiary region in a file whereby elevation information about each of the designated tertiary regions is available.

8. A method of digitized mapping of a three dimensional area comprising the steps of:
   dividing the area into a plurality of primary regions having defined closed contours which are considered flat;
   identifying within selected primary regions one or more secondary regions having defined closed contours which are considered flat;
   determining plan contour coordinate information for the contours of each primary region and of each secondary region;
   storing of the plan contour coordinate information in a file in a hierarchical fashion where each selected primary region has stored thereunder identified secondary regions thereof;
   designating certain primary and/or secondary regions for which elevation information is additionally desired;
   defining an imaginary grid of lines on each of the designated regions;
   determining of three dimensional coordinate information for each line intersection point of the grid of each designated region;
   storing of the intersection point three dimensional coordinate information in a file whereby elevation information about each of the designated regions is available;
   determining an average elevation value from all elevation information obtained; and
   storing of the elevation information of each grid intersection point as a difference from the average elevation value,
   wherein said storing steps store the digitally formatted coordinate information in a data base as text files.

9. A method of digitized mapping as claimed in claim 8, further including the steps of:
   inquiring about an elevation value at a selected location between intersection points; and
   interpolating of the inquired elevation value at the selected location using the intersection points located about the selected location.

10. A method of digitized mapping as claimed in claim 8, wherein said determining steps include the step of converting the coordinate information into a digital format.

11. A method of digitized mapping as claimed in claim 8, further including the step of displaying a selected primary region and identified secondary regions associated therewith.

12. A method of digitized mapping as claimed in claim 11, wherein said displaying step includes the step of generating an image of the selected primary region and then drawing in the identified secondary regions on the primary region.

13. A method of digitized mapping as claimed in claim 11, wherein said displaying step displays the regions to a scale such that a distance between any two points on the displayed regions is proportional to an actual physical distance therebetween.

14. A method of digitized mapping as claimed in claim 8, and further including the steps of:
   identifying within selected secondary regions one or more tertiary regions having defined closed contours which are considered flat;
   determining plan contour coordinate information for the contours of each tertiary region; and
   storing of the plan contour coordinate information of each tertiary region in the file in a further hierarchical fashion where each selected secondary region has stored thereunder the identified tertiary regions thereof.

15. A method of digitized mapping as claimed in claim 14, and further including the steps of:
   designating certain tertiary regions for which elevation information is desired;
   defining an imaginary grid of lines on each of the designated tertiary regions;
   determining of three dimensional coordinate information for each line intersection point of the grid of each designated tertiary region; and
   storing of the intersection point three dimensional coordinate information of each tertiary region in a file whereby elevation information about each of the designated tertiary regions is available.

16. A method of mapping of a three dimensional area comprising the steps of:
   dividing the area into a plurality of primary regions having defined closed contours which are considered flat;
   identifying within selected primary regions one or more secondary regions having defined closed contours which are considered flat;
   identifying within selected secondary regions one or more tertiary regions having defined closed contours which are considered flat;
   determining plan contour coordinate information for the contours of each primary, secondary and tertiary region;
   storing of the plan contour coordinate information in a computer file in a hierarchical fashion where each selected primary region has stored thereunder identified secondary regions thereof and each secondary region has stored thereunder identified tertiary regions;
   designating certain primary and/or secondary and/or tertiary regions for which elevation information is additionally desired;
   defining an imaginary grid of lines on each of the designated regions;
   determining of a plan coordinate information and an elevation coordinate information for each line intersection point of the grid of each designated region;
   determining an average elevation value for all elevation coordinate information obtained;
   converting each elevation coordinate information for each intersection point to an elevation difference from the average elevation value; and
   storing of the intersection point coordinate information as the flat coordinate information and an elevation difference in a computer file whereby elevation information about each of the designated regions is available.

17. A method of digitized mapping as claimed in claim 16, further including the steps of:
   inquiring about an elevation value at a selected location between intersection points; and
   interpolating of the inquired elevation value at the selected location using the elevation difference of the intersection points located about the selected location.

18. A method of digitized mapping as claimed in claim 16, wherein said determining steps include the step of converting the coordinate information into a digital format.

19. A method of digitized mapping as claimed in claim 18, wherein said storing steps store the digitally formatted coordinate information in a data base as text files.

20. A method of digitized mapping as claimed in claim 16, further including the step of displaying a selected primary region and identified secondary and tertiary regions associated therewith.

21. A method of digitized mapping as claimed in claim 20, wherein said displaying step includes the steps of:
 generating an image of the selected primary region;
 drawing in the identified secondary regions on the primary region; and
 drawing in each identified tertiary regions on each drawn secondary region.

22. A method of digitized mapping as claimed in claim 20, wherein said displaying step displays the regions to a scale such that a distance between any two points on the displayed regions is proportional to an actual physical distance therebetween.

* * * * *

UNITED STATES PATENT AND TRADEMARK OFFICE
CERTIFICATE OF CORRECTION

PATENT NO. : 7,065,244 B2  
APPLICATION NO. : 10/193279  
DATED : June 20, 2006  
INVENTOR(S) : Vassili A. Akimov Page 1 of 1

It is certified that error appears in the above-identified patent and that said Letters Patent is hereby corrected as shown below:

<u>In the Drawing Sheets</u>,  
Sheet 2 of 4, "PROPOSED FIG. 3" should read -- FIG. 3 --.  
Sheet 3 of 4, "PROPOSED FIG. 4A" should read -- FIG. 4A --.  
Sheet 4 of 4, "PROPOSED FIG. 4B" should read -- FIG. 4B --.

<u>Column 4</u>,  
Line 27, "AND "SAND"" should read -- and "SAND" --.

<u>Column 7</u>,  
Line 30, "plan coordinate" should read -- plan contour coordinate --.

<u>Column 8</u>,  
Line 35, "plan coordinate" should read -- plan contour coordinate --.  
Line 49, "plan coordinate" should read -- plan contour coordinate --.

Signed and Sealed this

Twenty-eighth Day of November, 2006

JON W. DUDAS  
*Director of the United States Patent and Trademark Office*